United States Patent
Coffee et al.

(10) Patent No.: US 11,988,172 B2
(45) Date of Patent: May 21, 2024

(54) IGNITION SAFETY DEVICE FOR A MULTI-PULSE OR MULTI-STAGE ROCKET MOTOR SYSTEM

(71) Applicant: Raytheon Company, Tewksbury, MA (US)

(72) Inventors: Shawn Coffee, Tucson, AZ (US); Saifur Ahmed, Oro Valley, AZ (US); Steven D. Jacob, Oro Valley, AZ (US); Thomas K. Harward, Tucson, AZ (US)

(73) Assignee: Raytheon Company, Tewksbury, MA (US)

(*) Notice: Subject to any disclaimer, the term of this patent is extended or adjusted under 35 U.S.C. 154(b) by 682 days.

(21) Appl. No.: 16/952,928

(22) Filed: Nov. 19, 2020

(65) Prior Publication Data
US 2022/0154670 A1  May 19, 2022

(51) Int. Cl.
*F02K 9/94* (2006.01)
*F02K 9/95* (2006.01)
*F42B 15/01* (2006.01)
*F42C 11/06* (2006.01)
*F42C 15/40* (2006.01)

(52) U.S. Cl.
CPC .......... *F02K 9/94* (2013.01); *F02K 9/95* (2013.01); *F42B 15/01* (2013.01); *F42C 11/065* (2013.01); *F42C 15/40* (2013.01)

(58) Field of Classification Search
None
See application file for complete search history.

(56) References Cited

U.S. PATENT DOCUMENTS

| 3,712,227 A | 1/1973 | Turner |
| 4,817,377 A | 4/1989 | Kirschner, Jr. |
| 4,956,971 A | 9/1990 | Smith |

(Continued)

FOREIGN PATENT DOCUMENTS

| AT | 307282 T | 11/2005 |
| AU | 2007339414 A1 | 7/2008 |

(Continued)

OTHER PUBLICATIONS

International Search Report and Written Opinion dated Dec. 23, 2021 in corresponding application No. PCT/U2021/027597.

*Primary Examiner* — Reginald S Tillman, Jr.
(74) *Attorney, Agent, or Firm* — Schwegman Lundberg & Woessner, P.A.

(57) ABSTRACT

An ignition safety device (ISD) used in an ignition system of a missile is configured to selectively control the ignition of two or more pulses or stages of a rocket motor propulsion system, based on a flight profile mode selection of a flight velocity mode, in which the missile is configured to travel at an optimized flight velocity, or a flight distance mode, in which the missile is configured to travel an optimized flight distance. The ISD is configured to selectively ignite the pulses or stages substantially simultaneously upon selection of the flight velocity mode, or in a delayed sequential manner upon selection of the flight distance mode. The ISD is also configured to selectively inhibit the delayed sequential ignition of the pulses or stages in the event of incidental ground or water impact of the missile after ignition of the primary pulse or stage.

20 Claims, 3 Drawing Sheets

(56) References Cited

U.S. PATENT DOCUMENTS

| | | | |
|---|---|---|---|
| 5,070,691 A | 12/1991 | Smith | |
| 5,206,989 A | 5/1993 | Smith | |
| 5,936,188 A | 8/1999 | Atkinson | |
| 6,096,802 A | 8/2000 | Lark | |
| 6,481,198 B1 | 11/2002 | Hepler | |
| 7,958,718 B1 | 6/2011 | Berchtold | |
| 7,958,825 B2 | 6/2011 | Lee | |
| 8,291,691 B2 | 10/2012 | Spear | |
| 8,397,486 B2 | 3/2013 | Mihara | |
| 8,424,438 B2 | 4/2013 | Facciano | |
| 9,151,579 B2 | 10/2015 | Martineau | |
| 9,207,054 B2 | 12/2015 | Ireland | |
| 9,448,026 B2 | 9/2016 | O'Dwyer | |
| 9,846,011 B1 | 12/2017 | Clark | |
| 10,107,601 B2 | 10/2018 | Villarreal | |
| 10,378,482 B2 * | 8/2019 | Hwang | F02K 9/95 |
| 2002/0171011 A1 | 11/2002 | Lopata | |
| 2009/0078145 A1 | 3/2009 | Lee | |
| 2010/0242772 A1 | 9/2010 | Martineau | |
| 2012/0137653 A1 | 6/2012 | Facciano | |
| 2017/0122259 A1 | 5/2017 | Kliger | |
| 2018/0245543 A1 | 8/2018 | Engelhardt | |

FOREIGN PATENT DOCUMENTS

| | | | |
|---|---|---|---|
| CN | 1299764 A | 6/2001 | |
| CN | 103122807 B | 11/2014 | |
| CN | 110631430 A | 12/2019 | |
| CN | 108488005 B | 2/2020 | |
| DE | 202004014122 U1 | 12/2004 | |
| DE | 102005041177 A1 | 6/2006 | |
| DE | 60114066 T2 | 7/2006 | |
| EP | 0354692 A1 | 2/1990 | |
| EP | 0388449 A1 | 9/1990 | |
| EP | 0291241 B1 | 11/1991 | |
| EP | 0298586 B1 | 12/1991 | |
| EP | 1138923 B1 | 10/2005 | |
| EP | 1993977 A1 | 11/2008 | |
| EP | 1851501 B1 * | 10/2016 | F41A 1/02 |
| FR | 2805855 B1 | 9/2002 | |
| IL | 86085 | 9/1988 | |
| IL | 86141 | 11/1988 | |
| IL | 143491 | 12/2002 | |
| IN | 601DEL2015 A | 9/2016 | |
| JP | 2006226201 A | 8/2006 | |
| JP | 2009174317 A | 8/2009 | |
| JP | 2009174318 A | 8/2009 | |
| KR | 20140094481 A | 7/2014 | |
| KR | 20140094482 A | 7/2014 | |
| KR | 20140005836 A | 11/2014 | |
| KR | 20150131470 A | 11/2015 | |
| KR | 20150138126 A | 12/2015 | |
| KR | 20150138127 A | 12/2015 | |
| KR | 20150138128 A | 12/2015 | |
| KR | 20150138129 A | 12/2015 | |
| KR | 20150138130 A | 12/2015 | |
| KR | 20150138131 A | 12/2015 | |
| KR | 20160061931 A | 6/2016 | |
| KR | 20160079738 A | 7/2016 | |
| KR | 20160093580 A | 8/2016 | |
| KR | 20170001964 A | 1/2017 | |
| KR | 101707959 B1 | 2/2017 | |
| RO | 126190 B1 | 12/2013 | |
| RU | 2647256 C1 | 3/2018 | |
| WO | 99/66418 A2 | 12/1999 | |
| WO | 02077660 W | 10/2002 | |
| WO | 2006026958 A1 | 3/2006 | |
| WO | 2008082427 A1 | 7/2008 | |
| WO | 2017/196427 A2 | 11/2017 | |
| WO | 2018217264 A1 | 11/2018 | |

* cited by examiner

IGNITION SAFETY DEVICE FOR A MULTI-PULSE OR MULTI-STAGE ROCKET MOTOR SYSTEM

GOVERNMENT LICENSE RIGHTS

This invention was made with Government support under contract number DOTC-16-01-INIT0084 Task 20, awarded by the United States of America Department of Defense. The Government has certain rights in the invention.

TECHNICAL FIELD

The present invention relates generally to missile ignition systems and more particularly to ignition systems for missiles having multiple rocket motors.

BACKGROUND

In missiles having a rocket motors, a propellant charge in a rocket motor is ignited by an ignitor in an ignition system. An electrical initiator is employed to initiate combustion of the propellant charge in the igniter. The initiator is triggered by an electrical current or signal from a selectively operable source. A missile may have a propelling system that includes multiple pulses or multiple stages of rocket motors. In these situations, independent ignition systems have previously been employed to ignite each pulse or stage. These solutions have focused on, for example, motor thrust control or generic rocket motor ignition.

SUMMARY

In a general embodiment, an ignition safety device (ISD) is provided for use in an ignition system of a missile having a multi-pulse or multi-stage rocket motor propulsion system, or in an unguided rocket ignition system for both military and commercial use where adjustable rocket motor thrust is desired. The ignition system may be an all-electric, in-line, solid propellant rocket motor ignition system. The ISD of the ignition system is configured to selectively control the ignition of a primary pulse or stage of the rocket motor propulsion system and one or more secondary pulse(s) or stage(s) of the rocket motor propulsion system in flight. The ISD has a modular configuration, allowing for easy implementation and selective control of additional pulses or stages in the configuration of the multi-pulse or multi-stage rocket motor propulsion system.

A flight profile mode selection is made manually or automatically prior to the missile being launched from, for example, a launcher. The flight profile mode may be a flight velocity mode, in which the missile is configured to travel toward its target at an optimized flight velocity, or a flight distance mode, in which the missile is configured to travel an optimized flight distance. An operator may manually select the flight profile mode in-field with a switch, or the flight profile mode may alternatively be automatically selected by launcher computer electronics that are configured to address both tactical distance and speed requirements for the missile to reach its target. The ISD of the ignition system is configured to selectively control the ignition of the primary pulse or stage of the rocket motor propulsion system and the one or more secondary pulse(s) or stage(s) of the rocket motor propulsion system based on the selection of the flight profile mode without further operator input after the missile has been launched. Specifically, the ISD of the ignition system is configured to selectively control a substantially simultaneous sequential ignition of the primary pulse or stage and the one or more secondary pulse(s) or stage(s) (one immediately after the other or within a few milliseconds of each other) upon selection of the flight velocity mode, or a delayed sequential ignition of the primary pulse or stage and the one or more secondary pulse(s) or stage(s) (one after a predetermined period of time from the other) upon selection of the flight distance mode. The ISD may also be configured to selectively inhibit the delayed sequential ignition of the one or more secondary pulse(s) or stage(s) in the event of incidental ground or water impact of the missile after ignition of the primary pulse or stage.

According to an aspect of the invention, an ignition system for igniting a plurality of energetic components in a missile includes a plurality of energetic initiators operatively coupled to a modular ignition safety device. The modular ignition safety device includes logic circuitry configured to receive a flight profile mode selection input and selectively control a first sequential activation or a second sequential activation of the plurality of energetic initiators based on the flight profile mode selection input. The first sequential activation includes a first time delay between the activation of each of the plurality of energetic initiators and the second sequential activation includes a second time delay between the activation of each of the plurality of energetic initiators. The second time delay is greater than the first time delay.

According to an embodiment of any paragraph(s) of this summary, the plurality of energetic components are a plurality of pulses of a multiple pulse rocket motor.

According to an embodiment of any paragraph(s) of this summary, the plurality of energetic components are a plurality of stages of a multiple stage rocket motor.

According to an embodiment of any paragraph(s) of this summary, the plurality of energetic initiators are respectively located within a plurality of capacitive discharge units.

According to an embodiment of any paragraph(s) of this summary, the flight profile mode selection input is a flight velocity input and the logic circuitry includes a flight profile selection circuit configured to receive the flight velocity input and control the first sequential activation of the plurality of energetic initiators.

According to an embodiment of any paragraph(s) of this summary, the flight profile mode selection circuit includes a dual timer configured to set the first time delay between the activation of each of the plurality of energetic initiators at 0 seconds.

According to an embodiment of any paragraph(s) of this summary, the flight profile mode selection input is a flight distance input and the logic circuitry includes a flight profile selection circuit configured to receive the flight distance input and control the second sequential activation of the plurality of energetic initiators.

According to an embodiment of any paragraph(s) of this summary, the flight profile mode selection circuit includes a dual timer configured to set the second time delay between the activation of each of the plurality of energetic initiators at a predetermined period of time greater than 0 seconds.

According to an embodiment of any paragraph(s) of this summary, the flight profile mode selection circuit includes a flight profile mode detector configured to receive the flight profile mode selection input.

According to an embodiment of any paragraph(s) of this summary, the logic circuitry includes an ignition inhibition circuit configured to receive at least one missile-generated motor input signal after activation of a first energetic initiator of the plurality of energetic initiators and selectively inhibit activation of a second energetic initiator of the plurality of energetic initiators based on the missile-generated motor input signal.

According to an embodiment of any paragraph(s) of this summary, the ignition inhibition circuit is activated when the flight profile mode selection input is the flight distance mode selection input.

According to an embodiment of any paragraph(s) of this summary, the missile-generated motor input signal is indicative of one or more flight conditions of the missile after activation of the first energetic initiator.

According to an embodiment of any paragraph(s) of this summary, the one or more flight conditions includes an acceleration of the missile.

According to an embodiment of any paragraph(s) of this summary, the ignition inhibition circuit is configured to inhibit activation of the second energetic initiator when the missile-generated motor input signal is indicative of one or more unstable flight conditions of the missile.

According to another aspect of the invention, a missile includes a plurality of energetic components. The missile also includes an ignition system for igniting the plurality of energetic components. The ignition system includes a plurality of energetic initiators operatively coupled to a modular ignition safety device. The modular ignition safety device includes logic circuitry configured to receive a flight profile mode selection input and selectively control a first sequential activation or a second sequential activation of the plurality of energetic initiators based on the flight profile mode selection input. The first sequential activation includes a first time delay between the activation of each of the plurality of energetic initiators and the second sequential activation includes a second time delay between the activation of each of the plurality of energetic initiators. The second time delay is greater than the first time delay.

According to another aspect of the invention, a method of selectively activating a plurality of energetic initiators to ignite a plurality of energetic components in a missile includes receiving a flight profile mode selection input. The method additionally includes controlling a first sequential activation of the plurality of energetic initiators when the flight profile mode selection input is a flight velocity mode input. The first sequential activation includes a first time delay between the activation of each of the plurality of energetic initiators. The method also includes controlling a second sequential activation of the plurality of energetic initiators when the flight profile mode selection input is a flight distance mode input. The second sequential activation includes a second time delay between the activation of the plurality of energetic initiators. The second time delay is greater than the first time delay.

According to an embodiment of any paragraph(s) of this summary, the controlling the first sequential activation includes setting the first time delay between the activation of each of the plurality of energetic initiators at 0 seconds.

According to an embodiment of any paragraph(s) of this summary, the controlling the second sequential activation includes setting the second time delay between the activation of each of the energetic initiators at a predetermined period of time greater than 0 seconds.

According to an embodiment of any paragraph(s) of this summary, the method further includes receiving at least one missile-generated motor input signal indicative of one or more flight conditions of the missile after the activation of a first energetic initiator of the plurality of energetic initiators, and selectively inhibiting activation of a second energetic initiator of the plurality of energetic initiators based on the missile-generated motor input signal.

According to an embodiment of any paragraph(s) of this summary, the selectively inhibiting activation of the second energetic initiator includes inhibiting activation of the second energetic initiator when the missile-generated motor input signal is indicative of one or more unstable flight conditions of the missile.

The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

In a general embodiment, an ignition system for igniting a plurality of energetic components in a missile is provided. The ignition system is configured to selectively activate a plurality of energetic initiators to ignite the plurality of energetic components in a substantially simultaneous sequential manner or in a delayed sequential manner upon detection of a successful missile launch from a launcher. The ignition system selectively activates the plurality of energetic initiators based on a selected flight profile mode of the missile, so that the missile is propelled either at an optimized flight velocity or with an optimized flight distance. Specifically, upon selection of a flight velocity flight profile mode, the ignition system is configured to activate a first energetic initiator of the plurality of energetic initiators and then immediately thereafter (i.e., in a substantially simultaneous sequential manner) activate a second energetic initiator of the plurality of energetic initiators. When the plurality of energetic initiators are activated substantially simultaneously, and the plurality of energetic components are ignited substantially simultaneously, the missile is propelled at an optimized flight velocity upon launch from the launcher. Alternatively, upon selection of a flight distance profile mode, the ignition system is configured to activate the first energetic initiator of the plurality of energetic initiators and then, after a predetermined period of time (i.e., in a delayed sequential manner), activate the second energetic initiator of the plurality of energetic initiators. When the plurality of energetic initiators are activated in a delayed sequential manner, and the plurality of energetic components are ignited in a delayed sequential manner, the missile is propelled for an optimized flight distance upon launch from the launcher.

Figure 1:
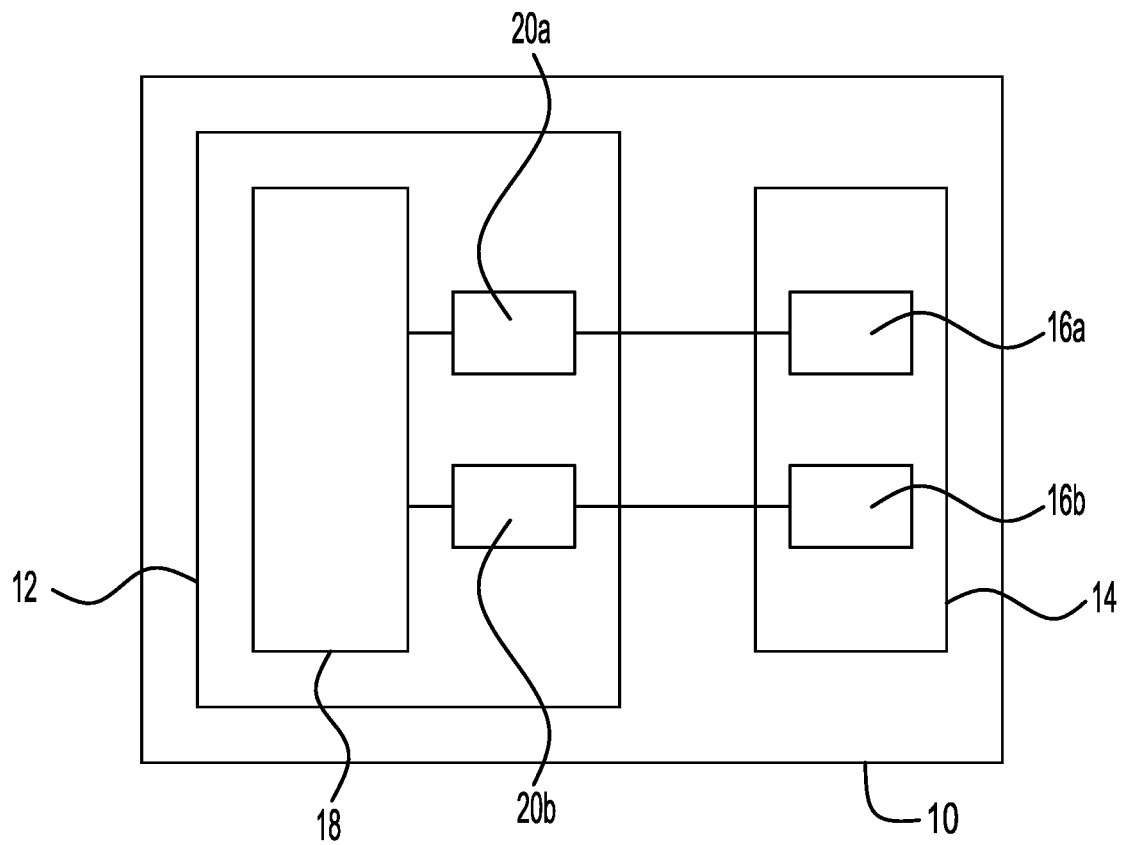
FIG. 1 is a schematic block diagram of an exemplary missile according to an aspect of the invention.

With reference to the figures, and initially to FIG. 1, an exemplary missile 10 is schematically depicted as having an ignition system 12 and a propulsion system 14. The propulsion system 14 includes a plurality of energetic components 16a, 16b. In various embodiments, the propulsion system 14 may be a multi-pulse rocket motor propulsion system or a multi-stage rocket motor propulsion system and the plurality of energetic components 16a, 16b may therefore be a plurality of pulses or stages, respectively.

The ignition system 12 of the missile 10 includes a modular ignition safety device (ISD) 18 and a plurality of energetic initiators 20a, 20b operatively, electronically, and modularly coupled to the modular ISD 18. The plurality of energetic initiators 20a, 20b may be respectively located within, for example, a plurality of capacitive discharge units configured to trigger electronic currents or signals to respectively ignite the plurality of energetic components 16a, 16b of the propulsion system 14. The modular configuration of the ISD 18 permits the addition of additional energetic components to the propulsion system 14 and associated energetic initiators to the ignition system 12 for optimization of the missile 10.

Figure 2:
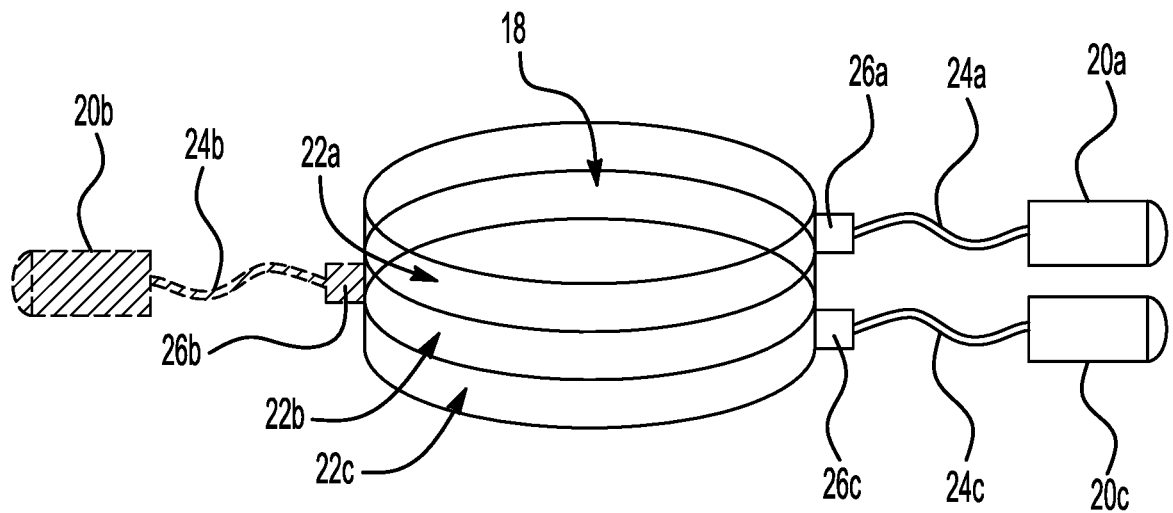
FIG. 2 is a schematic diagram of an exemplary modular ISD according to an aspect of the invention.
Figure 3:
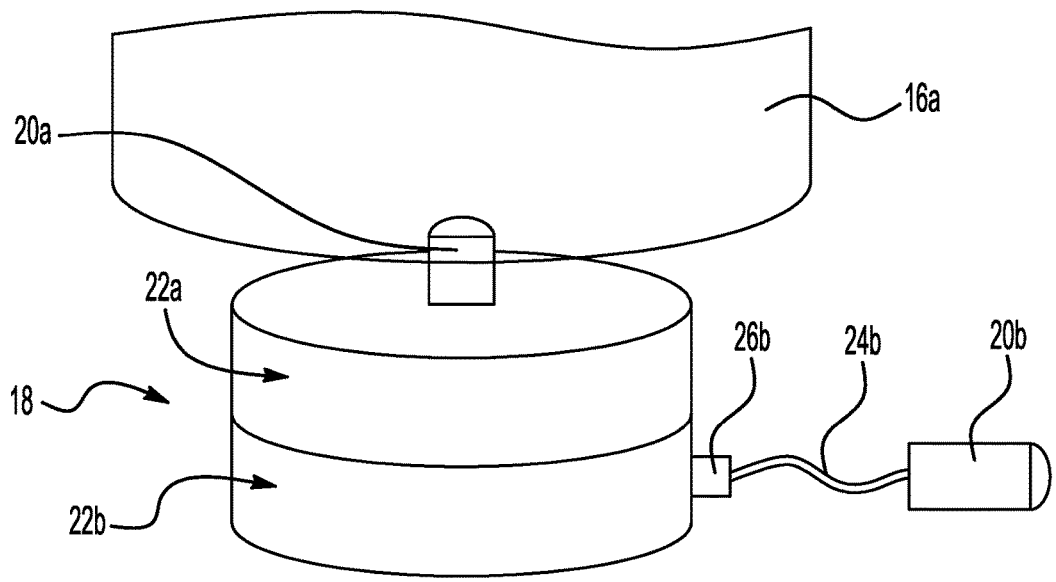
FIG. 3 is another schematic diagram of an exemplary modular ISD.

With additional reference to FIGS. 2-3, the modular configuration of the ISD 18 is further described herein. The ISD 18 has a modular configuration for flexibly accommodating modules 22a, 22b, 22c associated with multiple remote energetic initiators 20a, 20b, 20c connected to the respective modules 22a, 22b, 22c via cables 24a, 24b, 24c and connectors 26a, 26b, 26c. The modules 22a, 22b, 22c contain logic circuitry, which will be described in more detail below with reference to FIG. 4.

A missile having an existing energetic component 16a and electronic initiator 20a operatively and electronically coupled to an existing ISD module 22a is depicted in FIG. 3. The modular configuration of the ISD 18 permits a user to easily add one or more additional energetic components (not pictured) to the missile, and easily incorporate one or more respective module(s) 22b and associated logic circuitry, along with an associated one or more energetic initiator(s) 20b to the existing ISD 18. In this way, the user does not have to incorporate an independent ignition system for each additional energetic component that is added.

The modules 22a, 22b, 22c may be co-located within the ISD 18 or may be placed in separate compartments of the ISD. In the depicted embodiment, the modules 22a, 22b, 22c are arranged in a stacked relationship in the ISD 18. The separation of the logic circuitry in the ISD 18 and the remote energetic initiators 20a, 20b, 20c enables flexible missile configuration and addresses limited available space in the missile configuration. The electronics of the ISD may consist of industry standard COTS components, therefore limiting development requirements, and may be a military grade system and MIL-STD-1901 complaint.

Now turning to FIG. 4, the logic circuitry 30 of the modular ISD 18 will be described. The logic circuitry 30 may be implemented in a hardware circuit(s) or a combination of a hardware circuit(s) and a processor or control block of an integrated circuit(s) executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit and a processor and/or control block executing such code. The logic circuit 30 may be programmable.

Figure 4:
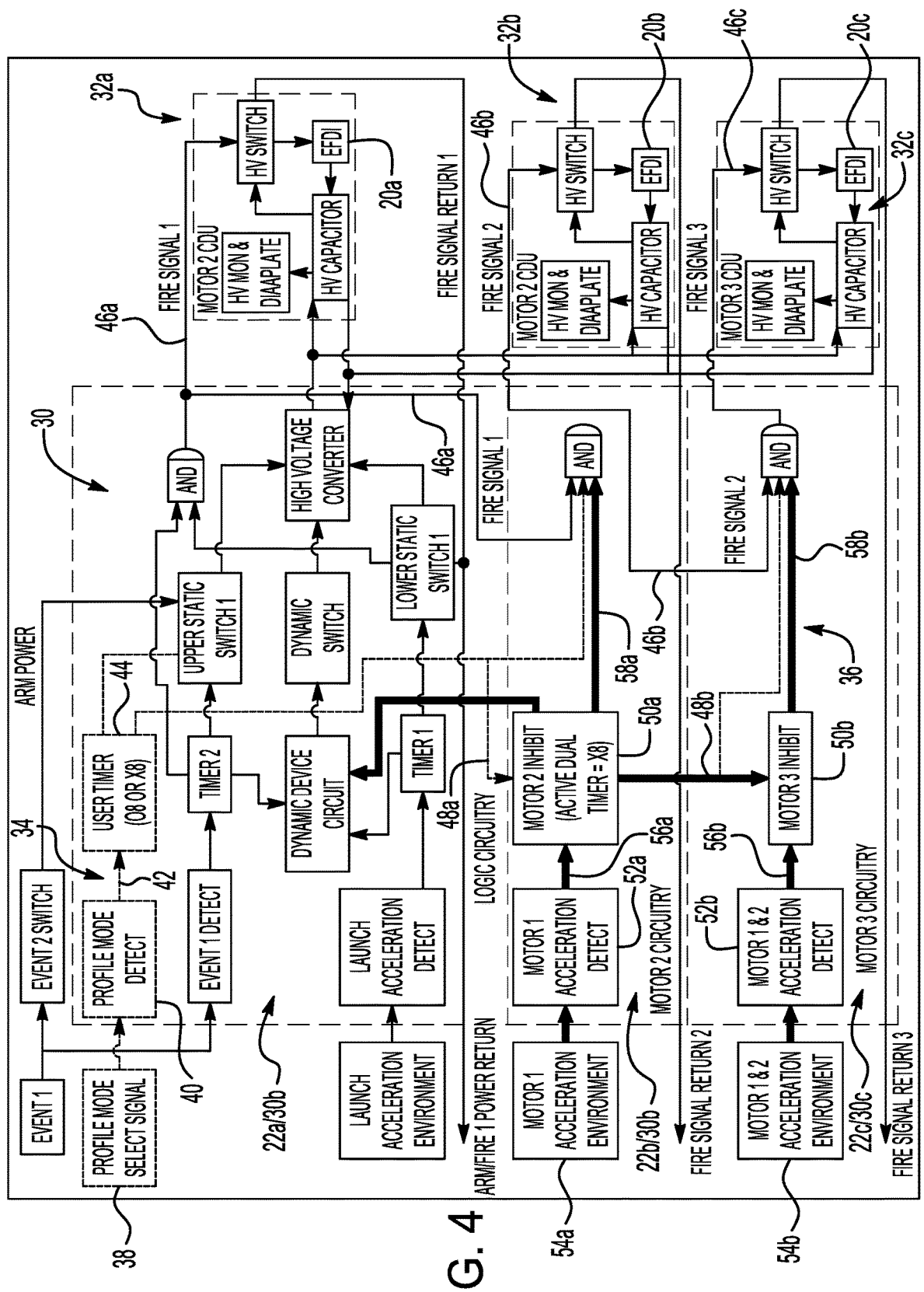
FIG. 4 is a schematic block circuit diagram of the modular ISD.

FIG. 4 depicts an embodiment of the modular ISD 18 having three modules 22a, 22b, 22c associated with three energetic initiators 20a, 20b, 20c for the substantially simultaneous sequential or delayed sequential ignition of three energetic components (not pictured). Each module 22a, 22b, 22c has associated logic circuitry 30a, 30b, 30c and each energetic initiator 20a, 20b, 20c has associated energetic initiator circuitry 32a, 32b, 32c operatively coupled to the logic circuitry 30. The energetic initiator circuitry 32a, 32b, 32c may be, for example, capacitive discharge units and the energetic initiators 20a, 20b, 20c may be exploding foil deflagrating initiators (EFDIs). Although the modular ISD 18 will be described herein with reference to an embodiment having three modules 22a, 22b, 22c associated with three energetic initiators 20a, 20b, 20c, it will be understood that the same principles apply for a modular ISD 18 having only two modules, or a modular ISD 18 having four or more modules.

The logic circuitry 30 of the modular ISD 18 includes a flight profile mode selection circuit 34 (depicted with a dotted line) which dynamically cooperates with the logic circuitry 30 to selectively control a substantially simultaneous sequential activation of the plurality of energetic initiators 20a, 20b, 20c (to ignite the plurality of energetic components substantially simultaneously), and a delayed sequential activation of the plurality of energetic initiators 20a, 20b, 20c (to ignite the plurality of energetic components in a delayed sequential manner). The flight profile mode selection circuit 34 is configured to receive a flight profile mode selection input 38. The flight profile mode selection input 38 is determined by a selection of a flight profile mode for the missile, which occurs in-field and before launching the missile from a launcher. For example, a range finder of the launcher may utilize laser or radar to measure a distance between the launcher and a desired target. Taking distance and speed requirements into consideration, the launcher may be configured to determine whether a flight velocity mode or a flight distance mode for the missile is desired for the missile to reach the desired target. Alternatively, an operator may manually select the optimal flight profile mode with a switch. Accordingly, the flight profile mode selection input 38 will either be a flight velocity mode selection input or a flight distance mode selection input.

The flight profile mode selection circuitry 34 therefore includes a flight profile mode detector 40 which receives the flight profile mode selection input 38 and sends an associated flight profile mode signal 42, indicative of the flight profile mode selection input 38, to a dual timer 44. The dual timer 44 is configured to selectively control the timing of activation of the plurality of energetic initiators 20a, 20b, 20c, depending on whether the flight profile mode selection input 38 is the flight velocity mode selection input or the flight distance mode selection input. Specifically, the dual timer 44 is configured to set one of two activation time delay options.

For example, when the flight profile mode selection input 38 is the flight velocity mode selection input, the dual timer 44 is configured to set a time delay of, for example, 0 seconds between the activation of a first energetic initiator 20a and the activation of a second energetic initiator 20b, between the activation of the second energetic initiator 20b and the activation of a third energetic initiator 20c, and so on for embodiments in which there are four or more energetic initiators coupled to the ISD 18. With the time delay of 0 seconds, the dual timer 44 cooperates with the logic circuitry 30*a*, 30*b*, 30*c* of each module 22*a*, 22*b*, 22*c* of the ISD 18 to activate the plurality of energetic initiators 20*a*, 20*b*, 20*c* to, in turn, ignite the plurality of energetic components of the missile substantially simultaneously (one immediately after the other).

Specifically, the logic circuitry 30*a* is configured to activate the first energetic initiator 20*a* to ignite the first energetic component associated therewith by sending a first fire signal 46*a* a high voltage switch in the first energetic initiator circuitry 32*a*. The high voltage switch is configured to activate the first energetic initiator 20*a* which releases high voltage from a high voltage capacitor, igniting the first energetic component. At the same time, the logic circuitry 30*a* sends the first fire signal 46*a* to the logic circuitry 30*b* of the second module 22*b*. When the time delay set by the dual timer 44 is 0 seconds, the logic circuitry 32*b* is configured to immediately activate the second energetic initiator 20*b* upon receipt of the first fire signal 46*a* to ignite the second energetic component associated therewith by sending a second fire signal 46*b* to a high voltage switch in the second energetic initiator circuitry 32*b*. The high voltage switch is configured to activate the second energetic initiator 20*b* which releases high voltage from a high voltage capacitor, igniting the second energetic component. At the same time, the logic circuitry 30*b* sends the second fire signal 46*b* to the logic circuitry 30*c* of the third module 22*c*. Again, when the time delay set by the dual timer 44 is 0 seconds, the logic circuitry 32*c* is configured to immediately activate the third energetic initiator 20*c* upon receipt of the second fire signal 46*b* to ignite the third energetic component associated therewith by sending a third fire signal 46*c* to a high voltage switch in the third energetic initiator 32*c*. The high voltage switch is configured to activate the third energetic initiator 20*c* which releases high voltage from a high voltage capacitor, igniting the third energetic component. The immediate subsequent activation of the second and third energetic initiators 20*b*, 20*c* immediately after the ignition of the first and second energetic initiators 20*a*, 20*b*, respectively, results in the substantially simultaneous sequential ignition of the first, second and third energetic components such that the missile is propelled at an optimized flight velocity.

Alternatively, when the flight profile mode selection input 38 is the flight distance mode selection input, the dual timer 44 is configured to set a time delay of a predetermined period of time between the activation of the first energetic initiator 20*a* and the activation of the second energetic initiator 20*b*, between the activation of the second energetic initiator 20*b* and the activation of a third energetic initiator 20*c*, and so on for embodiments in which there are four or more energetic initiators coupled to the ISD 18. The predetermined period of time may be, for example, greater than 0 seconds. With the time delay being a predetermined period of time, the dual timer 44 cooperates with the logic circuitry 30 of the ISD 18 to activate the plurality of energetic initiators 20*a*, 20*b*, 20*c* to, in turn, ignite the plurality of energetic components of the missile sequentially in a delayed manner with the predetermined period of time between each activation.

Specifically, the logic circuitry 30*a* is configured to activate the first energetic initiator 20*a* to ignite the first energetic component associated therewith by sending the first fire signal 46*a* the high voltage switch in the first energetic initiator circuitry 32*a*. At the same time, the logic circuitry 30*a* sends the first fire signal 46*a* to the logic circuitry 30*b* of the second module 22*b*. When the time delay set by the dual timer 44 is the predetermined period of time, the logic circuitry 32*b* is configured to wait for the predetermined period of time to pass upon receipt of the first fire signal 46*a* before activating the second energetic initiator 20*b* to ignite the second energetic component associated therewith. After the predetermined period of time has passed upon receipt of the first fire signal 46*a*, the logic circuitry 32*b* is configured to send the second fire signal 46*b* to the high voltage switch in the second energetic initiator circuitry 32*b*. At the same time, the logic circuitry 30*b* sends the second fire signal 46*b* to the logic circuitry 30*c* of the third module 22*c*. Again, when the time delay set by the dual timer 44 is the predetermined period of time, the logic circuitry 32*c* is configured to wait for the predetermined period of time to pass upon receipt of the second fire signal 46*b* before activating the third energetic initiator 20*c* to ignite the third energetic component associated therewith. After the predetermined period of time has passed upon receipt of the second fire signal 46*b*, the logic circuitry 32*b* is configured to send the third fire signal 46*c* to the high voltage switch in the third energetic initiator circuitry 32*c*. The delayed subsequent activation of the second and third energetic initiators 20*b*, 20*c* after a predetermined period of time from the activation of the first and second energetic initiators 20*a*, 20*b*, respectively, results in the delayed sequential ignition of the first, second and third energetic components such that the missile is propelled across an optimized flight distance.

The logic circuitry 30 of the ISD 18 also includes an ignition inhibition circuit 36 (depicted with a bolded line) which is configured to cooperate with each of the second and third energetic initiator circuitry 32*b*, 32*c* and associated logic circuitry 30*b*, 30*c* depicted in FIG. 4. In embodiments having four or more energetic initiators coupled to the ISD 18, the inhibition circuit 36 is additionally configured to cooperate with each of the fourth or more energetic initiator circuitry and associated logic circuitry.

The ignition inhibition circuit 36 is activated by the dual timer 44 when the dual timer 44 sets a time delay of a predetermined period of time, as described above. In other words, the ignition inhibition circuit 36 is activated when the flight profile mode selection input 38 is the flight distance mode selection input and the logic circuitry 30 is configured to control activation of the plurality of energetic initiators 20*a*, 20*b*, 20*c* in a delayed sequential manner, as previously described. Specifically, when the dual timer 44 sets a time delay of the predetermined period of time, the dual timer 44 sends an activation signal 48*a* to a first inhibitor 50*a* configured to selectively inhibit activation of the second energetic initiator 20*b*. The inhibition circuit 36 includes a first motor input detector 52*a* configured to receive a first missile-generated motor input signal 54*a* indicative of flight conditions of the missile after ignition of the first energetic component. For example, the first missile-generated motor input signal 54*a* may be indicative of an acceleration of the missile measured by an accelerometer of the missile.

Upon receipt of the first missile-generated motor input signal 54*a*, the first motor input detector 52*a* is configured to send a first selective inhibition signal 56*a* to the first inhibitor 50*a*, instructing the first inhibitor 50*a* whether or not to inhibit activation of the second energetic initiator 20*b*. Specifically, if the first missile-generated motor input signal 54*a* indicates that the flight conditions of the missile are not stable after ignition of the first energetic component (e.g., that the ignition of the first energetic component failed or that the missile has encountered incidental ground or water impact after ignition of the first energetic component), the first motor input detector 52a is configured to send the first selective inhibition signal 56a to the first inhibitor 50a, instructing the first inhibitor 50a to inhibit activation of the second energetic initiator 20b. Upon receipt of such first selective inhibition signal 56a, the first inhibitor 50a is configured to send an inhibition signal 58a to the high voltage switch of the second energetic initiator circuitry 32b to inhibit the second fire signal 46b from activating the second energetic initiator 20b. The second energetic initiator circuitry 32b includes a high voltage dissipation system that is configured to slowly discharge the high voltage buildup, resulting in an inactive second energetic initiator 20b after loss of high voltage supply.

Alternatively, if the first missile-generated motor input signal 54a indicates that the flight conditions of the missile are stable after ignition of the first energetic component, the first motor input detector 52a is configured to send the first selective inhibition signal 56a to the first inhibitor 50a, instructing the first inhibitor 50a to not inhibit activation of the second energetic initiator 20b. Upon receipt of such first selective inhibition signal 56a, the first inhibitor 50a is configured to not send the inhibition signal 58a to the high voltage switch of the second energetic initiator circuitry 32b.

When the first inhibitor 50a does not send the inhibition signal 58a to the high voltage switch of the second energetic initiator circuitry 32b (and the second energetic initiator 20b is therefore activated), the first inhibitor 50a is configured to send an activation signal 48b to a second inhibitor 50b configured to selectively inhibit activation of the third energetic initiator 20c. The inhibition circuit 36 therefore also includes a second missile input detector 52b configured to receive a second missile-generated motor input signal 54b indicative of flight conditions of the missile after activation of the second energetic initiator 20b and ignition of the second energetic component. For example, the second missile-generated motor input signal 54b may be indicative of an acceleration of the missile measured by the accelerometer of the missile.

Upon receipt of the second missile-generated motor input signal 54b, the second motor input detector 52b is configured to send a second selective inhibition signal 56b to the second inhibitor 50b, instructing the second inhibitor 50b whether or not to inhibit activation of the third energetic initiator 20c. Specifically, if the second missile-generated motor input signal 54b indicates that the flight conditions of the missile are not stable after ignition of the second energetic component (e.g., that the ignition of the second energetic component failed or that the missile has encountered incidental ground or water impact after ignition of the second energetic component), the second motor input detector 52ba is configured to send the second selective inhibition signal 56b to the second inhibitor 50b, instructing the second inhibitor 50b to inhibit activation of the third energetic initiator 20c. Upon receipt of such second selective inhibition signal 56b, the second inhibitor 50b is configured to send a second inhibition signal 58b to the high voltage switch of the third energetic initiator circuitry 32c to inhibit the third fire signal 46c from activating the third energetic initiator 20c. The third energetic initiator circuitry 32c includes a high voltage dissipation system that is configured to slowly discharge the high voltage buildup, resulting in an inactive third energetic initiator 20c after loss of high voltage supply.

Alternatively, if the second missile-generated motor input signal 54b indicates that the flight conditions of the missile are stable after ignition of the second energetic component, the second motor input detector 52b is configured to send the second selective inhibition signal 56b to the second inhibitor 50b, instructing the second inhibitor 50b to not inhibit activation of the third energetic initiator 20c. Upon receipt of such second selective inhibition signal 56b, the second inhibitor 50b is configured to not send the second inhibition signal 58b to the high voltage switch of the third energetic initiator circuitry 32c.

Figure 5:
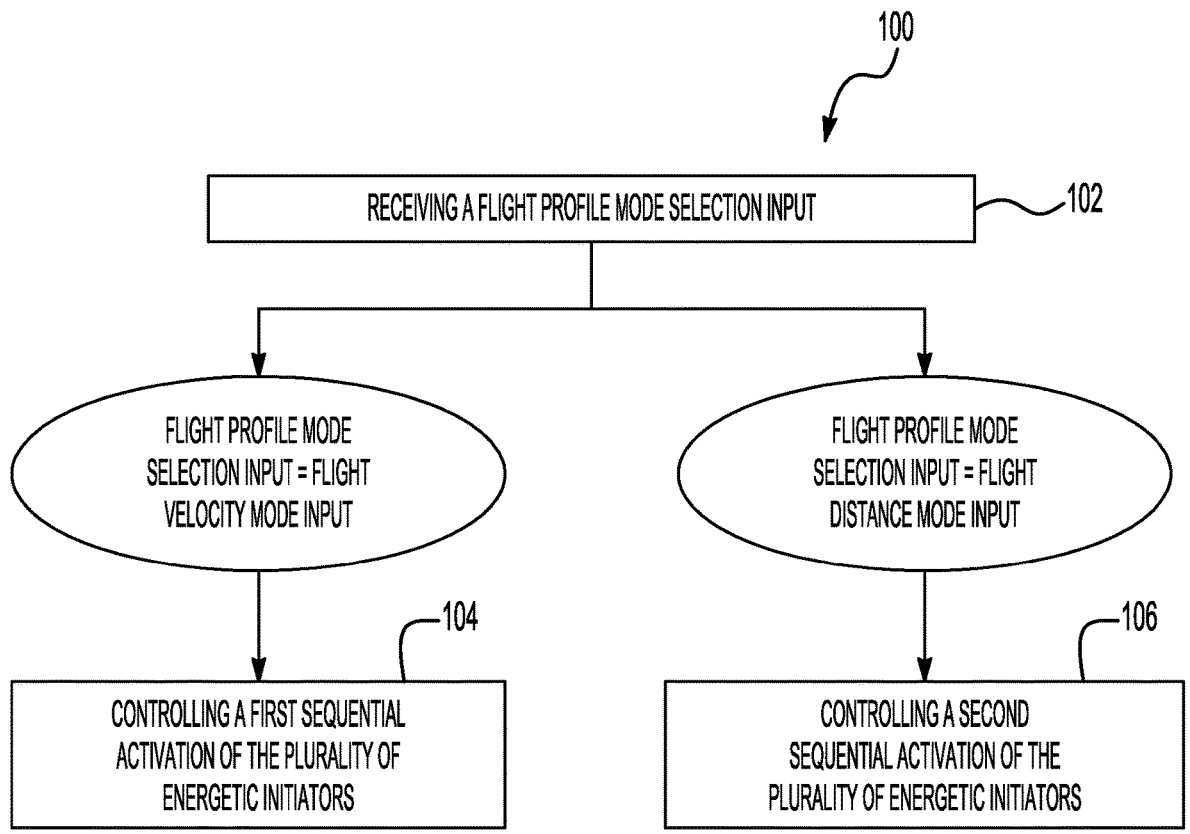
FIG. 5 is a flowchart of a method according to an aspect of the present invention.

With reference to FIG. 5, a method 100 of selectively activating a plurality of energetic initiators to ignite a plurality of energetic components in a missile is provided. The method includes a step 102 of receiving a flight profile mode selection input. The flight profile mode selection input may be received, for example, by the logic circuitry 30 of the ISD 18 previously described with reference to FIG. 4. The method 100 further includes a step 104 of controlling a first sequential activation of the plurality of energetic initiators when the flight profile mode selection input is a flight velocity mode input. The first sequential activation includes a first time delay between the activation of each of the plurality of energetic initiators. The step 104 of controlling the first sequential activation of the plurality of energetic initiators may include setting the first time delay between the plurality of energetic initiators at 0 seconds and may be accomplished by the ISD 18 previously described with reference to FIG. 4.

Alternatively, the method 100 includes a step 106 of controlling a second sequential activation of the plurality of energetic initiators when the flight profile mode selection input is a flight distance mode input. The second sequential activation includes a second time delay between the activation of the plurality of energetic initiators. The second time delay is greater than the first time delay. Accordingly, the step 106 of controlling the second sequential activation of the plurality of energetic initiators may include setting the second time delay between the activation of the plurality of energetic initiators at a predetermined period of time and may be accomplished by the ISD 18 previously described with reference to FIG. 4. The predetermined period of time may be, for example, greater than 0 seconds. The first and second time delays may be set by the dual timer 44 (FIG. 4).

The method 100 may further include a step of receiving at least one missile-generated motor input signal indicative of one or more flight conditions of the missile after the activation of a first energetic initiator of the plurality of energetic initiators and selectively inhibiting the activation of a second energetic initiator of the plurality of energetic initiators based on the missile-generated motor input signal. The missile-generated motor input signal may be received by the ignition inhibition circuitry 36 of the ISD 18, as previously described with reference to FIG. 4. The selectively inhibiting activation of the second energetic initiator may include inhibiting activation of the second energetic initiator and ignition of a second energetic component when the missile-generated motor input signal is indicative of one or more unstable flight conditions of the missile (e.g., that the ignition of the first energetic component failed or that the missile has encountered incidental ground or water impact after ignition of the first energetic component).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An ignition system for igniting a plurality of energetic components in a missile, the ignition system comprising:
a plurality of energetic initiators operatively coupled to a modular ignition safety device, the modular ignition safety device including logic circuitry configured to:
receive a flight profile mode selection input; and
selectively control a first sequential activation or a second sequential activation of the plurality of energetic initiators based on the flight profile mode selection input, of each of the plurality of energetic initiators and the second sequential activation includes a second time delay between the activation of each of the plurality of energetic initiators, the second time delay being greater than a first time delay.

2. The ignition system according to claim 1, wherein the plurality of energetic components are a plurality of pulses of a multiple pulse rocket motor.

3. The ignition system according to claim 1, wherein the plurality of energetic components are a plurality of stages of a multiple stage rocket motor.

4. The ignition system according to claim 1, wherein the plurality of energetic initiators are respectively located within a plurality of capacitive discharge units.

5. The ignition system according to claim 1, wherein the flight profile mode selection input is a flight velocity input and the logic circuitry includes a flight profile selection circuit configured to receive the flight velocity input and control the first sequential activation of the plurality of energetic initiators.

6. The ignition system according to claim 5, wherein the flight profile mode selection circuit includes a dual timer configured to set the first time delay between the activation of each of the plurality of energetic initiators at 0 seconds.

7. The ignition system according to claim 1, wherein the flight profile mode selection input is a flight distance input and the logic circuitry includes a flight profile selection circuit configured to receive the flight distance input and control the second sequential activation of the plurality of energetic initiators.

8. The ignition system according to claim 7, wherein the flight profile mode selection circuit includes a dual timer configured to set the second time delay between the activation of each of the plurality of energetic initiators at a predetermined period of time greater than 0 seconds.

9. The ignition system according to claim 5, wherein the flight profile mode selection circuit includes a flight profile mode detector configured to receive the flight profile mode selection input.

10. The ignition system according to claim 1, wherein the logic circuitry includes an ignition inhibition circuit configured to receive at least one missile-generated motor input signal after activation of a first energetic initiator of the plurality of energetic initiators and selectively inhibit activation of a second energetic initiator of the plurality of energetic initiators based on the missile-generated motor input signal.

11. The ignition system according to claim 10, wherein the ignition inhibition circuit is activated when the flight profile mode selection input is the flight distance mode selection input.

12. The ignition system according to claim 10, wherein the missile-generated motor input signal is indicative of one or more flight conditions of the missile after activation of the first energetic initiator.

13. The ignition system according to claim 10, wherein the one or more flight conditions includes an acceleration of the missile.

14. The ignition system according to claim 12, wherein the ignition inhibition circuit is configured to inhibit activation of the second energetic initiator when the missile-generated motor input signal is indicative of one or more unstable flight conditions of the missile.

15. A missile comprising:
a plurality of energetic components; and
an ignition system for igniting the plurality of energetic components, the ignition system including:
a plurality of energetic initiators operatively coupled to a modular ignition safety device, the modular ignition safety device including logic circuitry configured to:
receive a flight profile mode selection input; and
selectively control a first sequential activation or a second sequential activation of the plurality of energetic initiators based on the flight profile mode selection input, wherein the first sequential activation includes a first time delay between the activation of each of the plurality of energetic initiators and the second sequential activation includes a second time delay between the activation of each of the plurality of energetic initiators, the second time delay being greater than the first time delay.

16. A method of selectively activating a plurality of energetic initiators to ignite a plurality of energetic components in a missile, the method comprising:
receiving a flight profile mode selection input;
controlling a first sequential activation of the plurality of energetic initiators when the flight profile mode selection input is a flight velocity mode input, wherein the first sequential activation includes a first time delay between the activation of each of the plurality of energetic initiators; and
controlling a second sequential activation of the plurality of energetic initiators when the flight profile mode selection input is a flight distance mode input, wherein the second sequential activation includes a second time delay between the activation of the plurality of energetic initiators, the second time delay being greater than the first time delay.

17. The method according to claim 16, wherein the controlling the first sequential activation includes setting the first time delay between the activation of each of the plurality of energetic initiators at 0 seconds.

18. The method according to claim 16, wherein the controlling the second sequential activation includes setting the second time delay between the activation of each of the energetic initiators at a predetermined period of time greater than 0 seconds.

19. The method according to claim 16, further including receiving at least one missile-generated motor input signal indicative of one or more flight conditions of the missile after the activation of a first energetic initiator of the plurality of energetic initiators, and selectively inhibiting activation of a second energetic initiator of the plurality of energetic initiators based on the missile-generated motor input signal.

20. The method according to claim 19, wherein the selectively inhibiting activation of the second energetic initiator includes inhibiting activation of the second energetic initiator when the missile-generated motor input signal is indicative of one or more unstable flight conditions of the missile.

* * * * *